(12) United States Patent
Payne

(10) Patent No.: US 6,814,207 B2
(45) Date of Patent: Nov. 9, 2004

(54) FRICTION CLUTCH ASSEMBLY FOR AN AUTOMOTIVE VEHICLE POWERTRAIN

(75) Inventor: Kevin Charles Payne, Prescott Valley, AZ (US)

(73) Assignee: Midway Industries, Inc., Prescott, AZ (US)

( * ) Notice: Subject to any disclaimer, the term of this patent is extended or adjusted under 35 U.S.C. 154(b) by 0 days.

(21) Appl. No.: 10/305,093

(22) Filed: Nov. 26, 2002

(65) Prior Publication Data

US 2004/0099501 A1 May 27, 2004

(51) Int. Cl.⁷ .................. F16D 13/71; F16D 13/75
(52) U.S. Cl. .................. 192/70.27; 192/109 A; 192/110 R
(58) Field of Search .................. 192/70.26, 70.25, 192/70.28, 89.23, 89.24, 89.22, 89.26, 111 R, 110 R, 109 A, 70.27

(56) References Cited

U.S. PATENT DOCUMENTS

| | | | |
|---|---|---|---|
| 1,565,398 A | * 12/1925 | Rose | 192/70.26 |
| 1,579,359 A | * 4/1926 | Hallenbeck | 192/70.26 |
| 1,993,124 A | * 3/1935 | Tower | 192/111 R |
| 2,002,943 A | 5/1935 | Hartley | |
| 2,195,663 A | * 4/1940 | Wolfram | 192/70.28 |
| 2,229,319 A | * 1/1941 | Wesselhoff | 192/70.28 |
| 2,287,630 A | * 6/1942 | Miller | 192/70.26 |
| 2,287,631 A | * 6/1942 | Miller | 192/70.26 |
| 3,587,802 A | * 6/1971 | Pink | 192/89.26 |
| 4,425,991 A | 1/1984 | Hays | |
| 4,844,226 A | * 7/1989 | Taketani | 192/89.23 |
| 5,499,704 A | 3/1996 | Hays | |
| 6,039,161 A | * 3/2000 | Tanaka et al. | 192/70.28 |
| 6,062,365 A | 5/2000 | Gochenour | |
| 6,098,772 A | 8/2000 | Kimmig et al. | |
| 6,145,642 A | 11/2000 | Acker et al. | |
| 6,260,684 B1 | 7/2001 | Lebas et al. | |

* cited by examiner

*Primary Examiner*—Rodney H. Bonck
(74) *Attorney, Agent, or Firm*—Brooks Kushman P.C.

(57) ABSTRACT

A friction clutch assembly that is adapted particularly for use in a powertrain for a vehicle for controlling transfer torque to traction wheels for the vehicle. The torque capacity of the clutch assembly is modified by adjusting the effective clutch engaging force. Pressure balance springs oppose a primary clutch spring engaging force. The compression distance of the pressure balance springs is controlled to achieve an effective clutch engaging force that accommodates varying operating torque requirements.

7 Claims, 8 Drawing Sheets

FRICTION CLUTCH ASSEMBLY FOR AN AUTOMOTIVE VEHICLE POWERTRAIN

BACKGROUND OF THE INVENTION

1. Field of the Invention

The invention relates to a friction disc clutch of variable capacity for delivering torque from an engine to a geared transmission.

2. Background Art

The invention relates generally to a friction disc clutch for transferring torque from a torque source to a driven member. The clutch is adapted specifically to be used in a powertrain for an automotive vehicle to deliver torque from an engine to the torque input side of a power transmission mechanism as driving torque is delivered through the powertrain to the traction wheels. A typical friction clutch mechanism in an automotive vehicle driveline may be seen by referring to prior art U.S. Pat. Nos. 4,425,991 5,499,704, and 6,098,772.

An automotive friction clutch of this type comprises a thrust plate carried by a clutch housing in proximity to the facing of a flywheel. In the case of a powertrain having an internal combustion engine, the crankshaft of the engine would be secured to the flywheel and a friction disc assembly would be situated between the thrust plate and a radial face of the flywheel. A prior art construction of this kind is illustrated in FIGS. 1–6.

When a conventional friction clutch is used in an automotive vehicle powertrain, friction surfaces will be subject to wear and coefficients of friction will change. These factors, as well as other design characteristics, affect the operating torque capacity of the clutch. The torque capacity that is preset at the time of manufacture, however, cannot be changed within the field of service without removal of the clutch and redesigning or retrofitting its components. This is a costly and time-consuming process that is particularly undesirable in the automotive high-performance and racing clutch industry.

SUMMARY OF THE INVENTION

It is an objective of the invention to provide an improved clutch design wherein users of the clutch assembly can quickly and easily adjust the clutch spring pressure, and therefore the torque capacity of the clutch, as needed to suit a particular application or a particular operating condition. This objective is achieved by including in the clutch design one or more counteracting compression springs, which hereinafter will be referred to as pressure balance springs. The force of the pressure balance springs will partially cancel some of the force generated by a primary diaphragm spring.

The pressure balance spring can be any combination of small compression coil springs, flat springs, or stacked conical washer-type springs. They typically have a linear pressure curve; i.e., they will continuously increase in pressure linearly until their maximum compression distance is reached. A diaphragm spring also can serve as a pressure balance spring. In that case, both the primary diaphragm spring and the secondary pressure balance spring diaphragm have a bell shape pressure curve. The primary diaphragm spring and the secondary diaphragm spring, as in the case of a design with pressure balance springs with linear pressure curves, have forces that counteract each other.

The clamping force achieved by the clutch construction of the present invention is defined as the amount of force generated by the primary diaphragm spring times the mechanical spring lever ratio minus the counteracting force generated by the pressure balance springs.

The clutch design of the invention includes a rotary counter-thrust plate connected drivably to a torque source, such as a vehicle engine. A clutch assembly cover is connected to the counter-thrust plate. It defines with the counter-thrust plate a clutch housing. In a typical vehicle driveline environment, the counter-thrust plate is the engine flywheel.

A thrust plate in the clutch housing is drivably connected to the housing whereby rotary motion of the thrust plate relative to the flywheel is prevented while accommodating relative axial movement of the thrust plate.

A friction clutch disc with friction material on its peripheral portion is located between the flywheel and the thrust plate. A diaphragm spring lever in the clutch housing applies a clutch engaging force on the thrust plate. The spring lever is fulcrumed on the housing.

Pressure balance springs disposed between the thrust plate and the clutch housing oppose the clutch engaging force of the spring lever. The effective spring force of the pressure balance springs can be adjusted to effect control of the clutch torque capacity as the operating torque requirements change.

The pressure balance springs will provide also for a clutch disengagement assist, especially at high rotational speeds. This will avoid a tendency for the thrust plate to "bounce" or vibrate between the diaphragm spring and the clutch disc during disengagement.

Another function of the pressure balance springs is the enhancement of the quality of the clutch engagement. By tailoring the effective balance spring forces, the engagement of the clutch can be cushioned. Clutch engagement inertia forces due to rapid engagement are reduced or avoided.

BRIEF DESCRIPTION OF THE DRAWINGS

FIG. 4 is a plot of a generic bell shape curve for a Belleville type diaphragm spring and a linear curve for a coil type spring;

FIG. 4a is a detail view showing a conical washer spring and a compression spring;

FIG. 4b identifies the plots of FIG. 4 with the spring types seen in FIG. 4a;

FIG. 21 shows a plan view of a Belleville type pressure balance spring of the kind used in the design of FIGS. 20 and 20a;

DETAILED DESCRIPTION OF THE PREFERRED EMBODIMENT(S)

In the construction of FIGS. 1–6, a rotary counter-thrust plate 10 or 10' serves as a flywheel for an internal combustion engine. It is bolted to the crankshaft of the internal combustion engine by bolts 12 or by an alternative driving connection such as a key and keyway slot.

Figure 1:
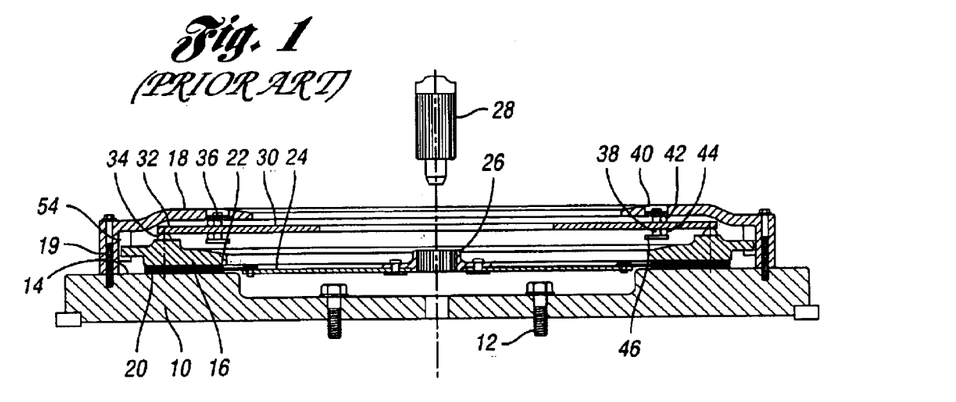
FIG. 1 is a cross-sectional view of a typical push-type friction clutch mechanism as seen from the plane of section lien 1—1 in FIG. 2.

A radial face 14 on the flywheel 10 serves as a clutch friction surface. A clutch pressure plate 16 is situated within a clutch cover which defines, together with flywheel 10, a clutch housing 18. The periphery of the clutch housing 18 is secured by a threaded attachment, as shown at 19, or by some other suitable attachment. The pressure plate 16 includes an annular friction surface 20 situated in juxtaposed relationship with respect to the friction surface 14 of the flywheel 10.

A friction disc 22 is disposed between the friction surfaces 14 and 20 of the flywheel 10 and the pressure plate 16, respectively. It is carried on the periphery of a clutch disc plate 24 within the housing 18. A clutch plate hub 26 is secured by rivets or by other suitable fastening means to the center portion of the clutch disc plate 24. A hub 26 is internally splined to permit a driving connection with an externally splined torque input shaft 28 for a geared transmission.

A Belleville spring is shown at 30. It acts as a spring, but it serves a secondary purpose as a clutch actuator lever. The Belleville spring defines an annular diaphragm with a peripheral edge 32 engageable with a thrust point 34 on the pressure plate 16. The Belleville spring is connected pivotally at 36 on the housing 18. The pivotal connection between the diaphragm spring 30 and the housing 18 is defined by a pin 38 secured at one end thereof, as shown at 40, to the housing 18. A pair of fulcrum rings 42 and 44 provide a fulcrum point for the Belleville spring 30. The ring 42 is situated between the housing 18 and the spring 30, and the fulcrum ring 44 is situated between the spring 30 and head 46 of pin 38.

Figure 2:
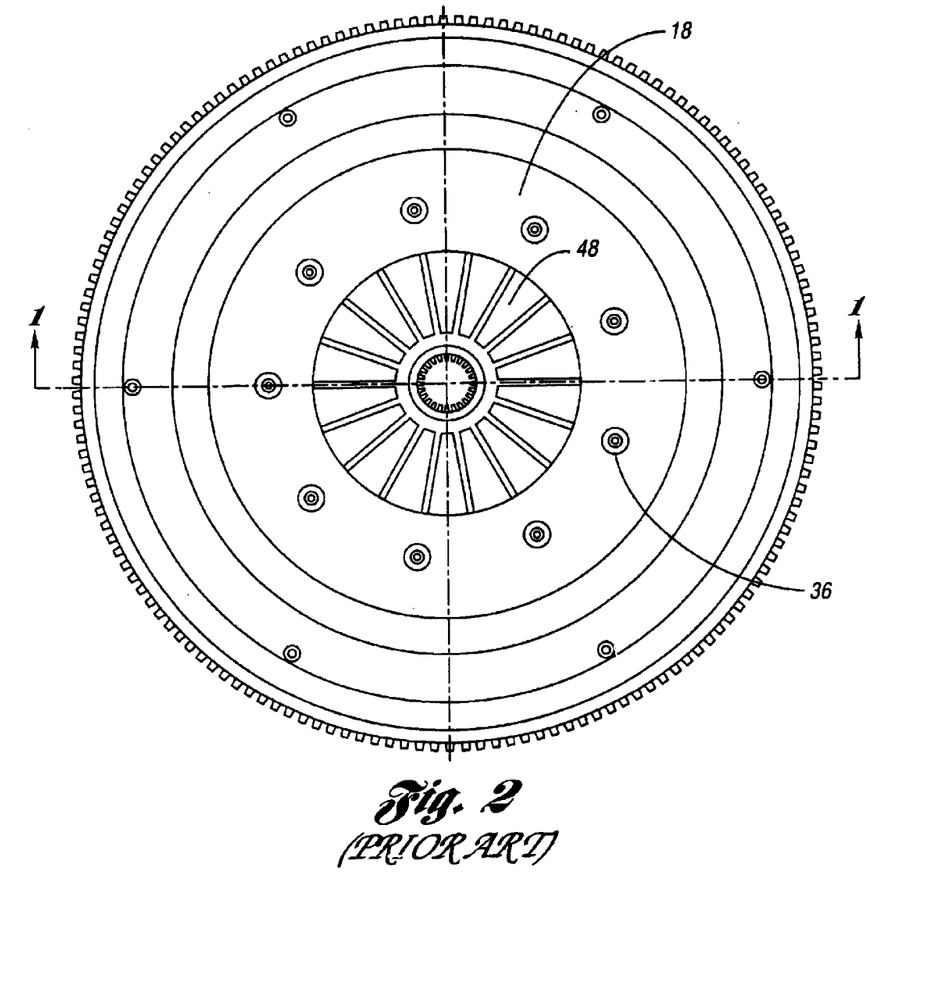
FIG. 2 is a plan view of the clutch construction of FIG. 1.

The diaphragm spring includes a series of arms 48, as seen in FIG. 2, which extend radially inward toward the axis of the hub 26. The arms 48 of the spring 30 encircle the axis of the hub 26 and define individual Class I levers which are pivoted on the fulcrum pins 36. Each arm 48 has a separate fulcrum as indicated in FIG. 2. The fulcrum pins 36 are uniformly spaced about the axis of the hub 26.

Figure 3:
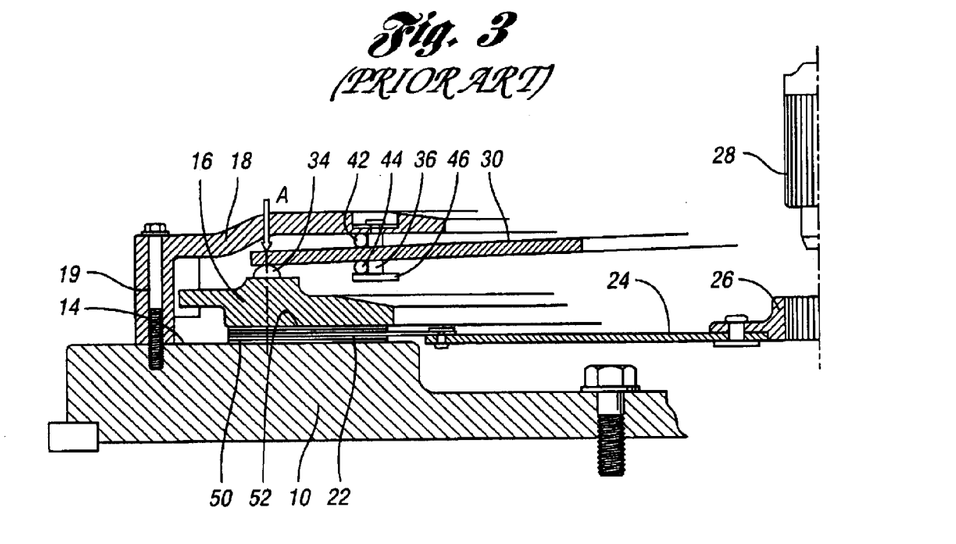
FIG. 3 shows a push-type friction clutch assembly with the friction clutch in the engaged position.

FIG. 3 is an enlarged cross-sectional view of a portion of the structure of FIG. 1. As seen in FIG. 3, the friction disc 22 forms a part of the friction clutch assembly. The assembly includes a first friction surface 50 adjacent the friction surface 14 of the flywheel 10, and a second friction surface 52 adjacent the annular friction surface of the pressure plate 16.

FIG. 3 shows a force vector "A", which is the force exerted by the spring 30 on the pressure point 34 on the friction disc assembly to establish a torque flow path between the engine crankshaft and the hub 26.

Figure 5:
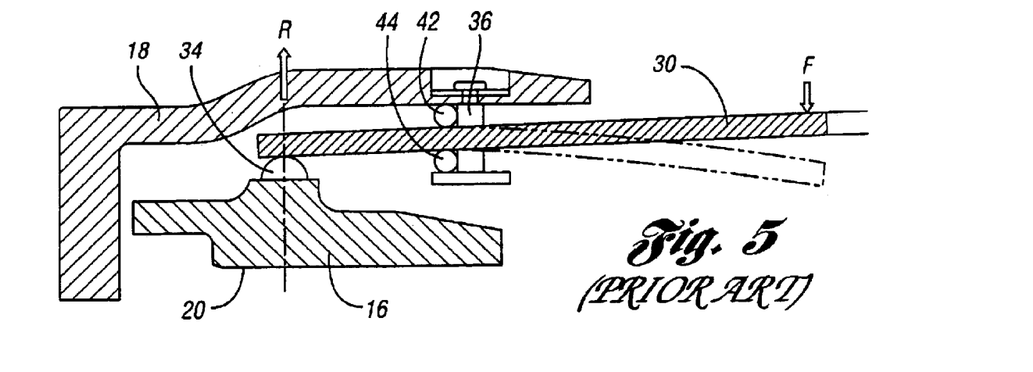
FIG. 5 shows the direction of the release force in a typical Class I mechanical lever ratio incorporated within the push-type clutch design.

FIG. 5 is a partial subassembly view showing the elements of the clutch shown in FIG. 3, but which illustrates the effect of a force "F" at the radially inward margin of the diaphragm spring 30. The diaphragm spring arms 48, which are fulcrumed at the pin 36, cause movement of the radially outward margin of the Belleville spring as shown by the release vector "R" in FIG. 5. This relieves the clamping force on the thrust plate 16.

A typical friction clutch of the kind shown in FIGS. 1–5 is mounted within the clutch housing by means of tangential leaf springs or drive straps, for example, so that the thrust plate cannot rotate within the housing. The drive strap or leaf spring is shown schematically in FIG. 1 by reference numeral 54. Although the thrust plate is prevented from moving rotatably relative to the clutch housing, it can move axially.

Typically, the spring 30 would maintain a cup shape in its relaxed state. As it is compressed, its force will increase to a point, and then it will start to decrease until it reaches its maximum compression distance. A typical bell shape displacement versus force characteristic is shown at 56 in the plot of FIG. 4. The diaphragm spring force is applied to the thrust plate by reason of the fixed fulcrum point at 36.

The distance measured between the release contact point on the diaphragm spring and the housing fulcrum point divided by the distance between the housing fulcrum point and the thrust plate point define a Class I lever mechanical ratio. The amount of the clamping force generated by the diaphragm spring times the multiplication of its force through the mechanical lever ratio is the force applied to the thrust plate. The clamping force can range from about 500 pounds to about 3500 pounds in a typical automotive powertrain clutch system. Special application clutches, such as racing vehicle powertrain clutches, are sometimes designed to work outside of this general force range.

Torque is transmitted through the clutch by means of the frictional connection between the thrust plate and flywheel surfaces and the friction clutch disc plate connected to the disc carrier. Although a clutch construction illustrated in FIGS. 1–5, for example, has a so-called solid hub friction disc with no damper springs, some automotive powertrain applications use a sprung hub, which operates in the same manner as a solid hub friction disc with the exception of the addition of radially located damper springs contained within the friction disc hub. Such a sprung hub design is shown, for example, in U.S. Pat. No. 6,098,772.

As previously described, the clutch mechanism is disengaged by a release mechanism, typically a clutch "throw out" bearing, which presses against the radial arms 48 at a radially inward location to effect release of the spring pressure exerted on the thrust plate. This causes a gap to develop between the thrust plate and the flywheel. The clutch is disengaged once the gap has increased to a distance greater than the combined thickness of the friction disc plate and the two friction facings on the clutch plate.

Figure 6:
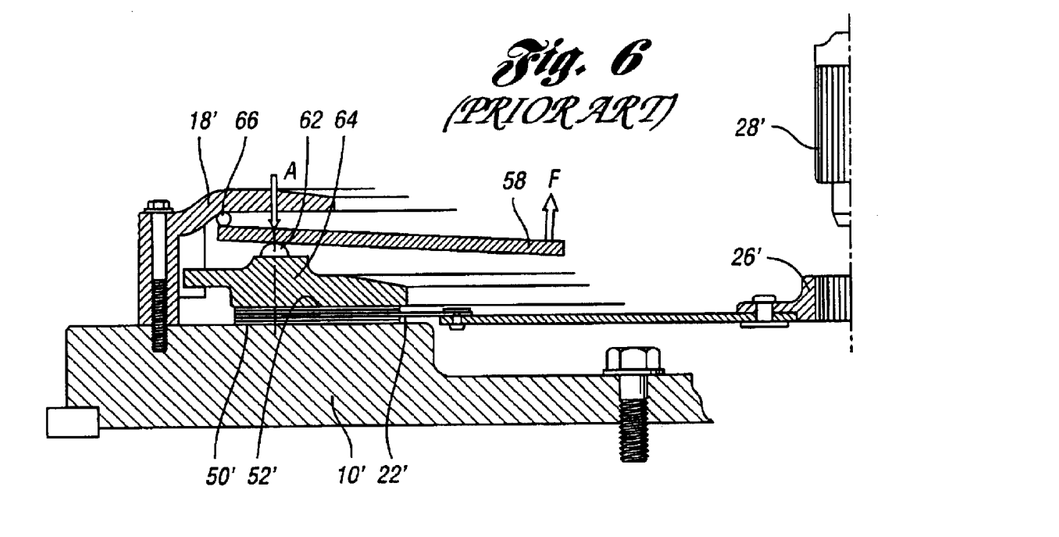
FIG. 6 shows the direction of the release force in a typical Class II mechanical lever ratio incorporated within the pull-type clutch design.

The design of FIGS. 1–5 is commonly referred to as a push-style clutch, which describes the direction of the release load applied to the diaphragm by the clutch disengagement mechanism as the diaphragm spring arms are pushed toward the power source. In contrast, a pull-type clutch is illustrated in FIG. 6. It includes a diaphragm spring 58, which acts as a Class II lever. The radially outward periphery of the diaphragm spring 58 engages a fulcrum ring 66 when the Belleville spring arms apply a force, shown at "A" in FIG. 6, to a pressure point 62 on thrust plate 64. If the radially inward ends of the Belleville spring arms 58 are pulled, the force shown at "F" applied to the pressure plate 64 is released.

In FIG. 6, each of the elements that have a counterpart in the construction of FIGS. 1–5 have been indicated by the same reference numeral, although prime notations are added to the common elements in FIG. 6.

The torque capacity of a friction clutch of the kind disclosed in FIGS. 1–7 is defined as the maximum torque that can be transferred through the clutch while it is in its fully engaged state. Once the torque capacity has been exceeded, torque can be lost through unintentional slipping at the friction surfaces of the thrust plate and the flywheel with respect to the friction facings of the clutch disc.

Figures 4, 4A, 4B:
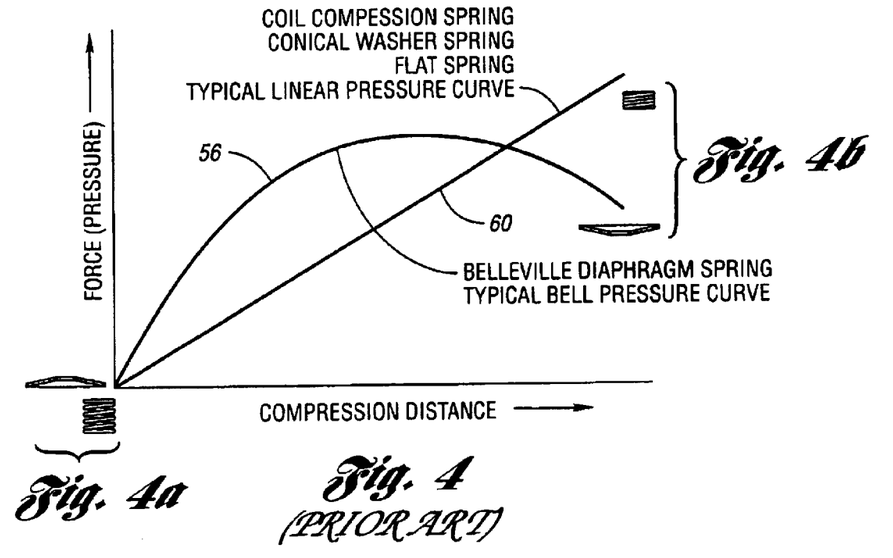

The force and deflection characteristics of a typical coil compression spring is illustrated in FIG. 4b by reference numeral 60. This characteristic is linear as distinct from the bell shape characteristic shown at 56 for a typical diaphragm spring. The diaphragm spring and the coil springs are shown in FIG. 4a.

The factors that determine torque capacity of a given clutch construction include the pressure generated by the diaphragm spring, the diameter of the friction clutch, the total amount of the frictional contact area, the coefficient of friction between the disc friction facing, and the friction surfaces of the thrust plate and flywheel. As previously explained, these factors in prior art constructions are specified at the time of manufacture and cannot be changed when the clutch is operating in a powertrain in its field of service. Consequently, a friction clutch that does not perform as expected or a clutch that needs to operate outside the factory preset torque capacity must be redesigned and then manufactured accordingly. This is a costly and time-consuming task and is particularly undesirable for the automotive high-performance and racing clutch industry.

Figure 7:
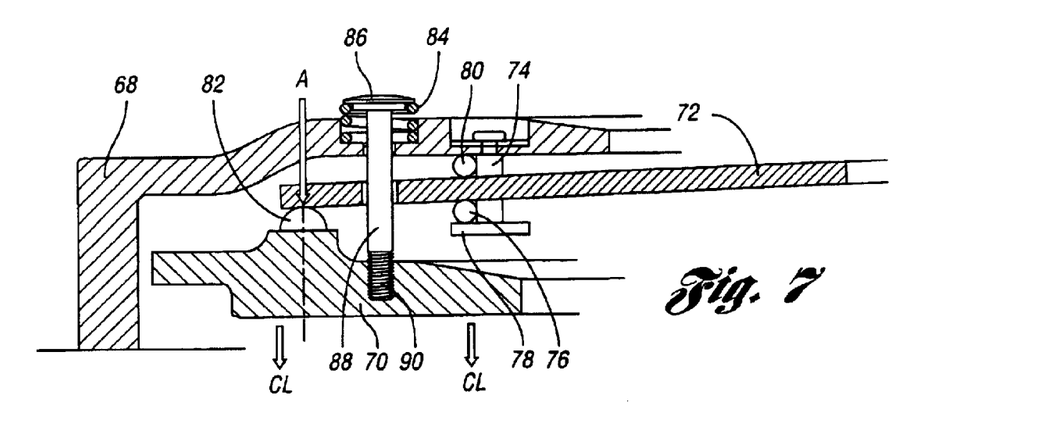
FIG. 7 shows a push-type clutch construction with pressure balance springs, components of the construction being removed to show the detail of the spring elements.

FIG. 7 shows the balance springs in the construction of the invention. The clutch shown in FIG. 7, as in the case of the prior art designs, includes a clutch housing 68 and a pressure plate 70. A Belleville spring 72 is fulcrumed by fulcrum pin 74, which, as in the case of the prior art designs, is connected to the clutch housing. A fulcrum ring 76 is disposed between the diaphragm spring 72 and the head 78 of the fulcrum pin 74. A second fulcrum ring 80 is located between the housing 68 and the spring 72.

The radially outward margin of the spring 72 engages pressure point 82 on the pressure plate 70.

A compression coil spring or pressure balance spring is shown at 84. It is situated between a spring seat or head 86 on support pin or pull rod 88, the end of which is threadably received in a threaded opening in the pressure plate 70 as shown at 90.

The spring 84 is seated on the housing and exerts a force on the pressure plate that opposes the force developed by the spring 72 on the pressure point 82. The force applied at pressure point 82 is shown by the vector "A", which may be about 2800 pounds. The force developed by the spring 72 is compounded by the mechanical lever ratio. A counteracting force of about 600 pounds may be applied in a direction opposite to the direction of force "A". The counteracting force is developed by balance springs 84. The resulting net clamping force then is about 2200 pounds in the direction "$C_L$."

Figure 8:
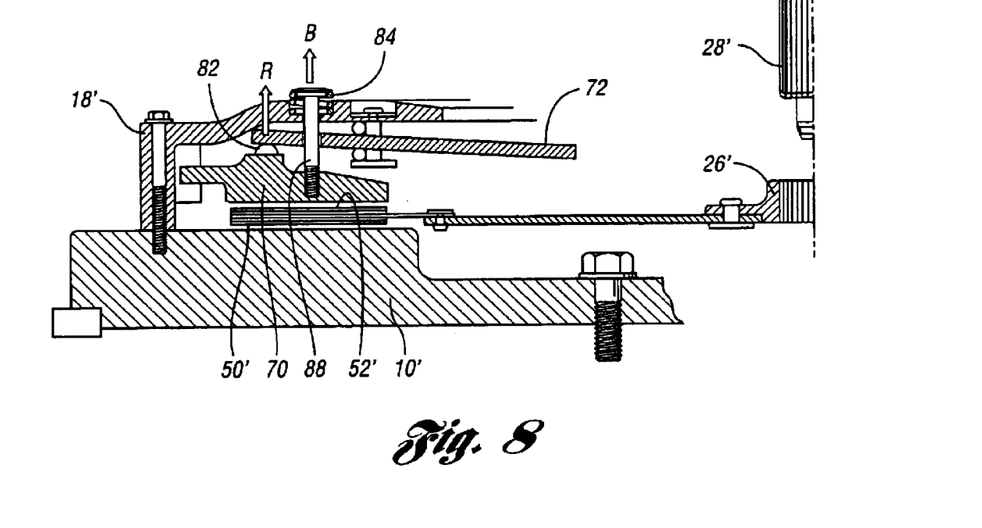
FIG. 8 shows a clutch construction of the push-type wherein the pressure plate is in the disengaged position.

FIG. 8 is a view similar to the view of FIG. 7, but it shows the diaphragm spring in a clutch release position, thereby reversing the direction of the clutch apply force, as shown by the vector "R" in FIG. 8. In the case of the operating mode shown in FIG. 8, the pin or pull rod 88 moves the pressure plate 70 away from the friction surface of the flywheel 10 under the influence of the spring 84, thereby creating a gap between the pressure plate and the friction clutch surface 52' and between the flywheel and the friction clutch surface 50'.

The pressure balance springs of FIGS. 7 and 8 are mounted within pockets located about the clutch housing. Each spring is retained by a pressure balance spring cap or seat. The opposite end of the pull rod 88 is secured to the thrust plate. The pull rod 88 is allowed to pass through the clutch housing and the diaphragm spring by means of clearance holes, as shown, without resistance or interference.

The pressure balance springs 84 apply a balance force and urge the spring seats and the attached pull rods in the direction B shown in FIG. 8. Consequently, by means of the attached threaded pull rod 88, the thrust plate 70 is loaded against the diaphragm spring 72 at the point of the thrust plate pressure point 82. This counteracts and partially cancels some of the force generated by the diaphragm spring 72. By varying the compression distance of the pressure balance springs, the opposing force that they generate in the direction B can be altered, resulting in more or less counteracting force against the diaphragm spring and allowing for adjustment of the force $C_L$. The compression distance can be varied, for example, by using shims of selected thickness, under pull rod head 86.

Figure 9:
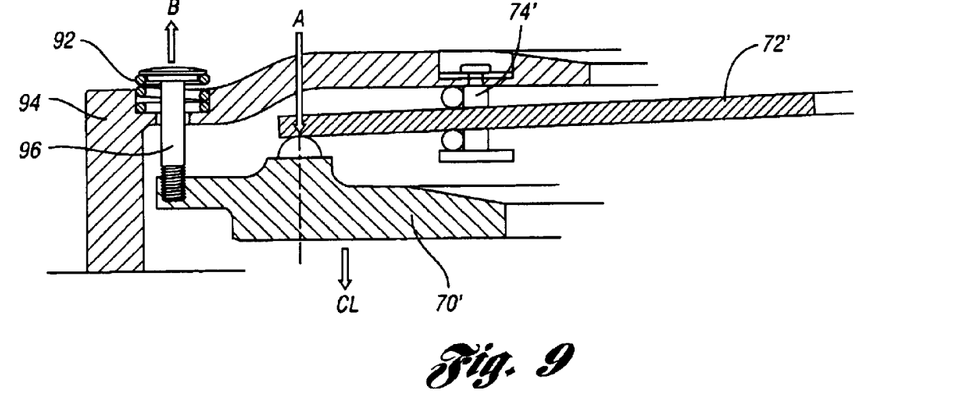
FIG. 9 shows a clutch construction of the push-type wherein the pressure balance springs are located at the radially outward margin of the pressure plate.

FIG. 9 shows a cross-sectional view of an alternate construction. It functions in a manner similar to the clutch construction of FIGS. 7 and 8. The pressure balance springs, however, which are shown at 92 in FIG. 9, are located at the outer diameter of the clutch housing 94. This arrangement simplifies the design since it eliminates the need for providing an additional clearance hole for the pull rod 96 in the diaphragm spring 72'.

Figure 10:
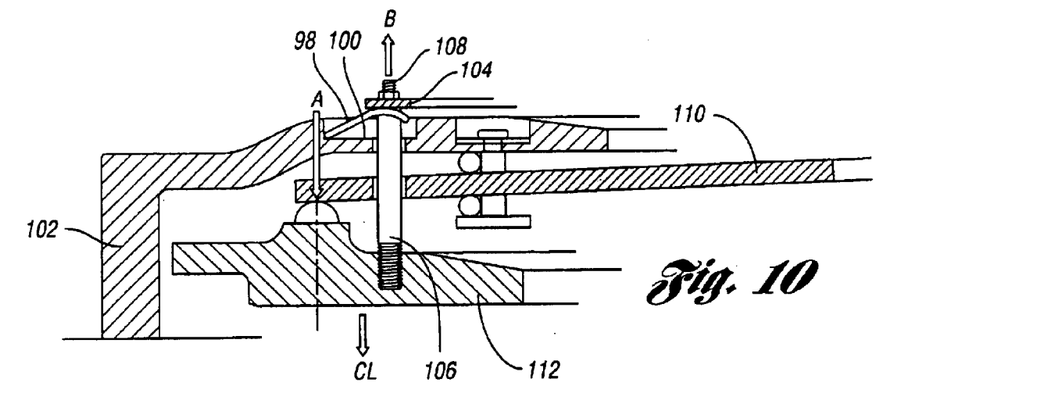
FIG. 10 is a view of a clutch construction of the push-type wherein the pressure balance spring is a diaphragm spring rather than a plurality of compression springs.

FIG. 10 shows an alternate construction wherein each pressure balance spring 98 is a diaphragm-type spring, which is located in an annular groove 100 in the clutch housing 102. A pressure balance spring cap 104 retains the spring 98 on pull rod 106. One end of the pull rod is threaded, as shown at 108, to permit adjustment of the spring 98. The rod 106 passes through clearance holes in the diaphragm spring and in the housing 102. The spring 98 applies a force in the direction "B", seen in FIG. 10, which opposes the force applied to the thrust plate 112 by diaphragm spring 110. The force of spring 98 counteracts and partially cancels some of the force of the spring 110 in the direction A, seen in FIG. 10. By purposefully varying the compression distance of the pressure balance spring 98, the opposing force that it generates in the direction B can be altered, thus allowing for convenient adjustment of the force $C_L$.

Figure 11:
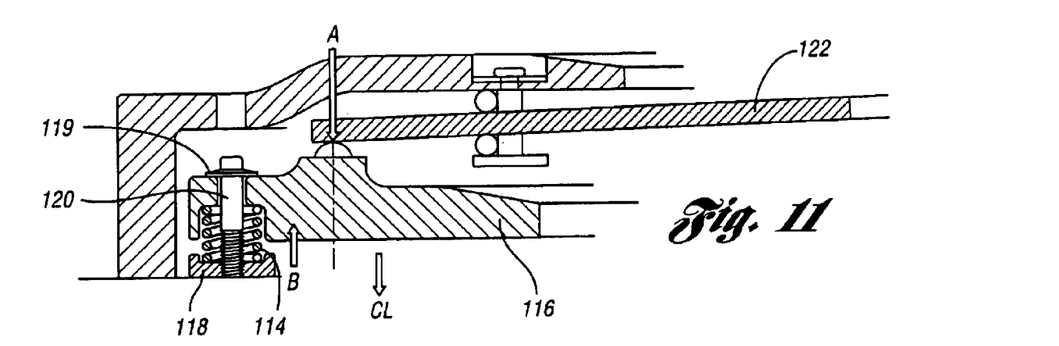
FIG. 11 is a view of a push-type clutch design wherein the pressure balance springs are carried by the pressure plate.

FIG. 11 shows another construction of a push-type clutch, which includes multiple radially spaced pressure balance springs 114 located in pockets in the outer diameter portion of the thrust plate 116. The balance springs 114 are each seated on a spring cap 118 and are retained by a threaded adjustment bolt or pull rod 120 which passes through the thrust plate 116, a sufficient clearance being provided in the opening in thrust plate 116 through which the rod 120 passes. The force of the balance springs 114 urges the thrust plate in the direction B. The spring cap 118 engages the adjacent surface of the flywheel.

The force in the direction B counteracts and partially cancels some of the force of the diaphragm spring shown at 122. The result is a balance of pressure between the combined sum of the multiple lesser forces of the pressure balance springs and the greater force of the spring 122 in the direction $C_L$. The threaded adjustment of adjustment rod 120 permits variations in the pressure of the balance springs. Alternatively, preselected shims of various thickness can be inserted under rod head 119 to control torque capacity.

Figure 12:
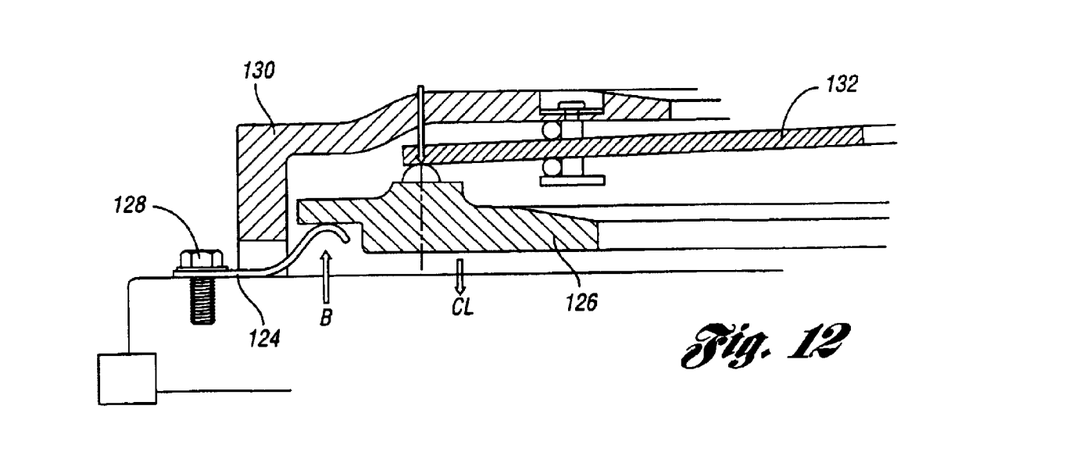
FIG. 12 is a view of a push-type clutch construction of the kind shown in FIG. 11 wherein the spring that acts on the pressure plate is a leaf spring rather than a coil spring.

FIG. 12 shows another variation of the invention wherein balance springs 124, which are in the form of a flat or leaf-type spring, are located radially outward of the thrust plate 126. Each spring 124 is secured by bolts 128 at a location radially outward of the clutch housing 130. Flat spring 124 extends through an opening in the radially outward margin of the clutch housing 130. The force of the spring 124 urges the thrust plate 126 in the direction B, which opposes the force of the diaphragm spring 132. By varying the compression distance of springs 124, adjustment of the force $C_L$ can conveniently be controlled.

Figure 13:
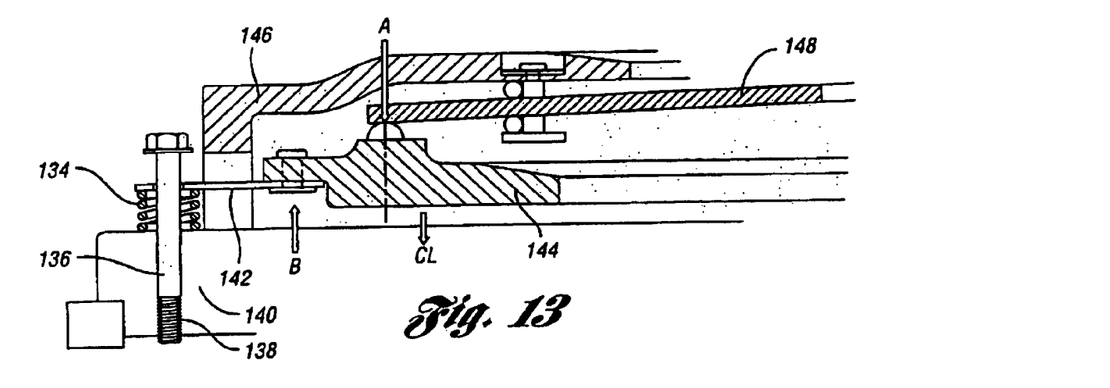
FIG. 13 is a view of a clutch construction similar to the clutch construction of FIGS. 11 and 12 wherein the pressure balance springs are located externally of the housing.

FIG. 13 shows another construction of the invention wherein pressure balance compression springs 134 are located by retaining bolt 136, which is threaded, as shown at 138, in flywheel 140. A lift bar 142 is secured to the outer margin of the pressure plate 144 by rivets or by other fastening techniques. The lift bar extends through an opening in the radially outward margin of the clutch housing 146.

The resulting force of the pressure balance springs 134 urges the thrust plate 144 in the direction of arrow B. This counteracts the force of diaphragm spring 148.

Figure 14:
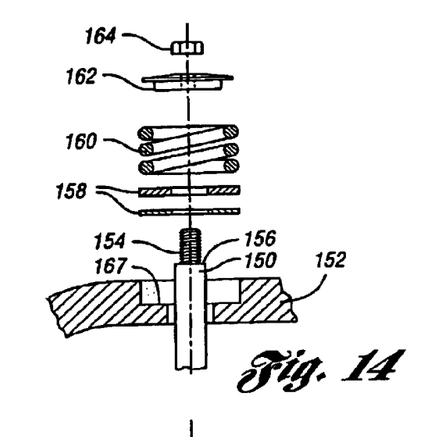
FIG. 14 is a detailed cross-sectional view in exploded form showing pressure balance springs and related hardware.

FIG. 14 shows an alternate design of the pressure balance springs. These springs function in a manner similar to the function of the springs shown in FIGS. 7 and 9. They are mounted, however, in a different fashion. The pull rod shown at 150 extends through the clutch housing 152 with a generous clearance opening. The outward end of the pull rod 150 is threaded as shown at 154. A shoulder 156, located at the base of the threaded portion 154, supports a spring cap 162. Spring cap 162 is secured to the threaded end of the rod 150 and held in place against shoulder 156 by nut 164. The compression distance of the spring 160 can be varied by varying the thickness of the spacer and spring seat washers 158, which seat at 167 within clutch housing 152.

Figure 15:
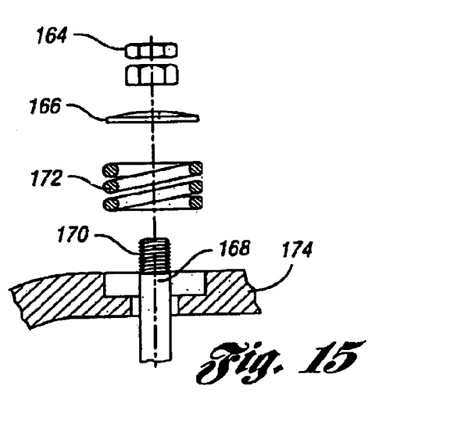
FIG. 15 shows pressure balance springs with different hardware compared to the hardware shown in FIG. 14.

The design of FIG. 15 is similar to the design of FIG. 14, except that a lock nut 164 can be used to secure spring cap 166 on the threaded end of pull rod 168. The cap 166 can be adjusted within the threaded range of the pull rod 168, which is threaded as shown at 170. As in the case of the design of FIG. 14, the springs 172 of FIG. 15 are seated in pockets formed in the clutch housing 174.

Figure 16:
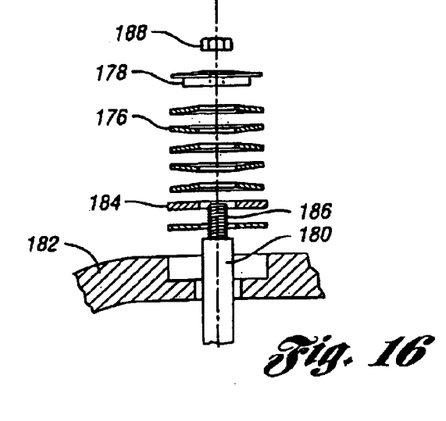
FIG. 16 is a view showing pressure balance springs comprising conical spring washers.
Figure 17:
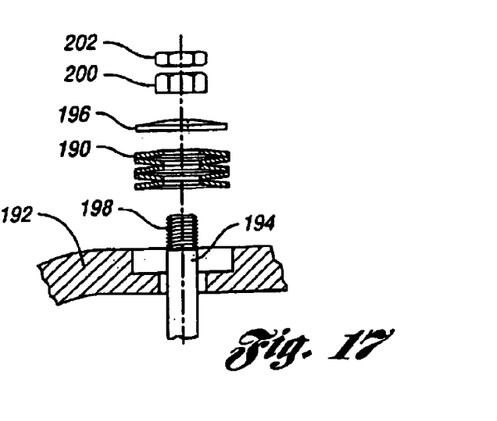
FIG. 17 is a view corresponding to FIG. 16 but the compression washers are assembled together rather than in an exploded format as seen in FIG. 16.

The designs of FIGS. 16 and 17 are similar to the designs of FIGS. 14 and 15, respectively, except that conical spring washers are used, rather than coil compression springs. These spring washers generally generate a linear pressure curve, such as the plot 60 in FIG. 4. The conical spring washers, shown at 176, are stacked in side-by-side relationship. A spring cap 178 provides a seat for the stacked springs 176. The springs 176 are fitted over the pull rod 180 and are located in a spring pocket formed in clutch housing 182. Shins or spring seats 184 can be selected to provide a variable balance spring adjustment. The pull rods 180 are externally threaded as shown at 186. The cap 178 is held in place by a nut 188.

In the case of FIG. 17, the conical spring washers shown at 190 are received in a spring pocket formed in clutch housing 192. The springs 190 are fitted over pull rod 194. A spring cap 196, threadably received on a threaded end 198 of pull rod 194, provides a seat for the spring washers 190. The washers are held in place by adjustment nut 200, which in turn is secured by a lock nut 202. By adjusting the position of the nut 200, the effective balance spring force can be altered as desired.

Figure 18:
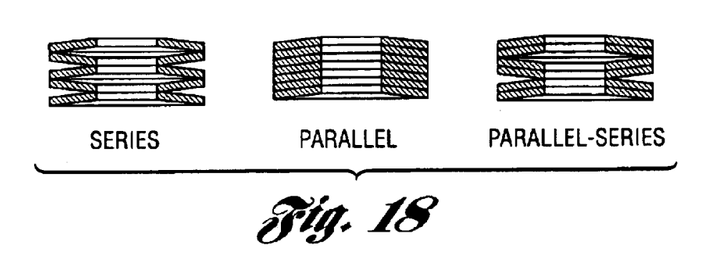
FIG. 18 shows arrangements of conical spring washers stacked in series and parallel relationship.

The effective balance spring force can be altered by arranging the spring washers in series, or in parallel, or in a parallel-series arrangement as shown in FIG. 18. Furthermore, conical spring washers can be added or deleted, depending upon the driving torque requirements.

Figure 19:
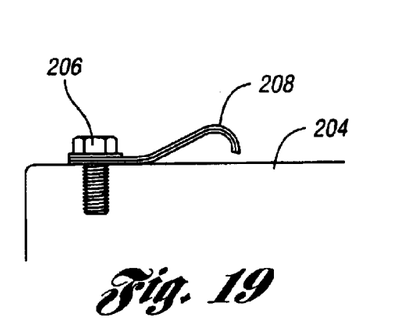
FIG. 19 is a cross-sectional view of a leaf-type flat pressure balance spring and related hardware.
Figure 19A:
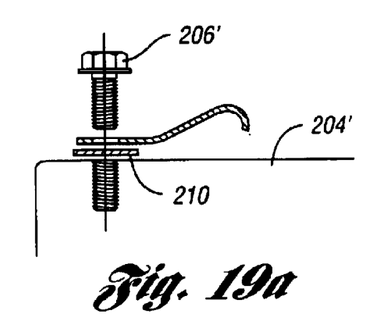
FIG. 19a is a view similar to FIG. 19, although the flat pressure balance spring of FIG. 19a includes a spacer that alters the spring characteristics.

FIGS. 19 and 19a show multiple, radially-located, leaf-type flat springs, which are secured to the flywheel 204 and 204'. The flat springs can be secured by retaining bolts 206 or 206'. The effective pressure balance force, in the case of the design in FIG. 19, can be changed by using multiple springs, as seen at 208, or by using varying numbers of shims 210, as seen in FIG. 19a.

Figure 20:
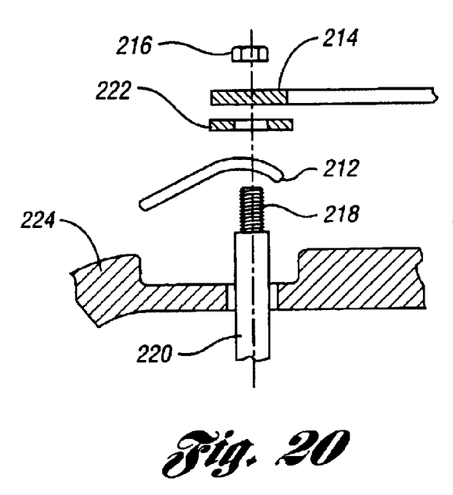
FIG. 20 is a view similar to the view of FIG. 14, although the pressure balance spring is a Belleville type pressure balance spring.
Figure 21:
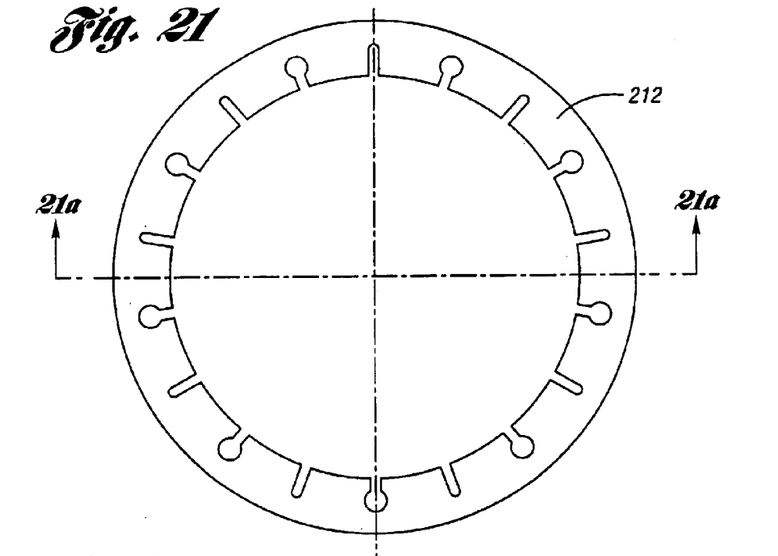
Figure 21A:
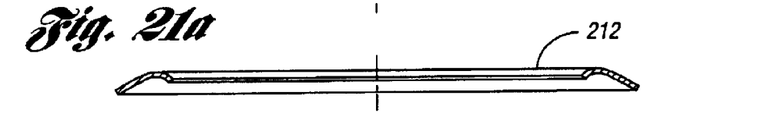
FIG. 21a is a cross-sectional view of the Belleville spring of FIG. 21 as seen from the plane of section line 21a—21a of FIG. 21.

FIG. 20, 21 and 21a show an annular diaphragm pressure balance spring at 212. A spring cap 214 is used to provide a seat for the spring 212. The cap 214 is held in place by lock nut 216 which is threadably received on a threaded end 218 of pull rod 220. Shims 222 can be added or deleted in order to vary the compression distance of the spring 212. The spring seat 222 and the cap 214 are seated on pull rod 220 at the base of the threaded portion 218.

Figure 20A:
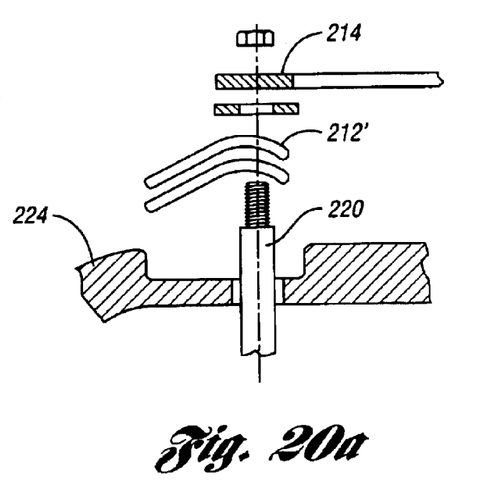
FIG. 20a is a view similar to the view of FIG. 20, although a pair of Belleville type pressure balance springs is used.

In the case of the design of FIG. 20a, multiple diaphragm-type pressure balance springs can be used, as shown at 212', to vary the effective pressure balance force. The pull rods 220 extend through openings formed in the housing 224 with a generous clearance.

Figure 22:
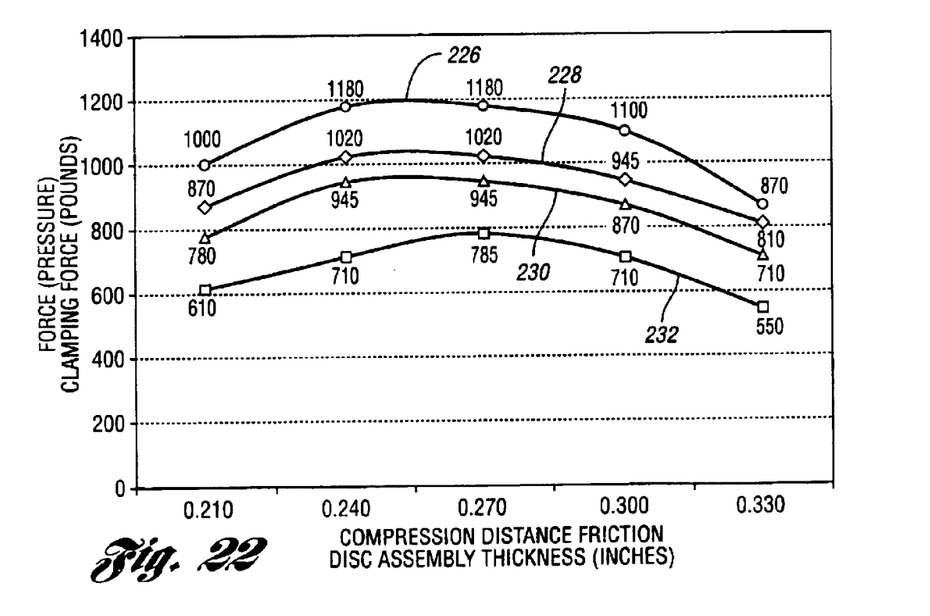
FIG. 22 is a plot showing the deflection and force for diaphragm type springs in a clutch assembly and the effect of friction disc wear, as well as the effect of using pressure balance springs with various spring rates.

The graph of FIG. 22 shows a pressure curve at 226 produced by a conventional diaphragm type pressure plate assembly. The graph illustrates the effective friction disc wear versus pressure plate clamping force during a typical service life of the friction clutch. By using adjustable pressure balance springs in accordance with the invention, the pressure curves can be changed, as shown at 228, 230 and 232. This demonstrates the adjustability concept of the invention. This feature is particularly useful during high performance or competition type vehicle operation where many variables exist that cannot be controlled or anticipated by the clutch manufacturer. These variables include, but are not limited to, engine torque, transmission and final drive gear ratios, vehicle weight, tire diameter, driving style, and driving conditions. By using the features of the present invention, adjustments may be made to "tune" the pressure plate assembly to particular applications and driving conditions.

Although embodiments of the invention have been disclosed, it will be apparent to persons skilled in this art that modifications may be made without departing from the scope of the invention. All such modifications and equivalents thereof are intended to be covered by the following claims.

What is claimed is:

1. A friction disc clutch assembly for an automotive vehicle driveline having an engine, a geared transmission and vehicle traction wheels, the clutch being engageable and disengageable to control torque delivery from the engine to the traction wheels through the transmission, the clutch assembly comprising:

a rotary counter-thrust plate connected drivably to the engine and defining an engine flywheel;

a clutch assembly cover connected to and rotatable with the flywheel and defining therewith a clutch housing;

a thrust plate in the clutch housing, the thrust plate being connected drivably to the clutch housing for rotary motion while accommodating axial displacement relative to the flywheel;

a clutch disc assembly having a hub portion, a torque input shaft for the transmission being adapted to be drivably connected to the hub portion;

friction material carried by a peripheral portion of the clutch disc assembly, the friction material being disposed between juxtaposed annular friction surfaces on the thrust plate and the flywheel;

a Belleville spring lever in the housing, a radial inward portion of the spring lever being positioned for displacement under an axially extending force, a radial outward portion of the spring lever being engageable with the thrust plate, an intermediate portion of the spring lever being fulcrumed on the housing;

pressure balance springs disposed between the thrust plate and the clutch housing, the pressure balance springs opposing the force applied to the thrust plate by the Belleville spring lever; and means for adjusting the effective spring force of the pressure balance springs whereby the net force applied to the thrust plate is controlled to effect a desired clutch capacity for a given set of operating torque requirements;

the pressure balance springs being carried by the thrust plate, each pressure balance spring having a cap, a pull rod extending through the pressure balance spring and through the thrust plate, the spring cap being connected to the pull rod, the spring cap engaging the flywheel, the force of the balance spring opposing the force applied to the thrust plate by the spring lever.

2. A friction disc clutch assembly for delivering torque from a torque source to a driven member, the clutch assembly comprising:

a rotary counter-thrust plate connected drivably to the torque source;

a clutch assembly cover connected to the counter-thrust plate and defining therewith a clutch housing;

a thrust plate in the clutch housing, the thrust plate being drivably connected to the housing whereby rotary motion of the thrust plate relative to the counter-thrust plate is prevented while accommodating relative axial movement of the thrust plate;

a clutch disc assembly having a hub portion adapted to be drivably connected to the driven member and a peripheral portion between the thrust plate and the counter-thrust plate;

a diaphragm spring lever in the housing, a radial inward portion of the spring lever being positioned for displacement under an axially extending force, a radial outward portion of the spring lever being engageable with the thrust plate, an intermediate portion of the spring lever being fulcrumed on the housing;

pressure balance springs disposed between the thrust plate and the clutch housing, the pressure balance springs opposing the force applied to the thrust plate by the diaphragm spring lever; and means for adjusting the effective spring force of the pressure balance springs whereby the net force applied to the thrust plate is controlled to effect a desired clutch torque capacity for a given set of operating torque requirements;

the pressure balance springs being flat springs, and means for varying the compression distance of the flat springs thereby modifying the clutch torque capacity.

3. A friction disc clutch assembly for delivering torque from a torque source to a driven member, the clutch assembly comprising:

a rotary counter-thrust plate connected drivably to the torque source;

a clutch assembly cover connected to the counter-thrust plate and defining therewith a clutch housing;

a thrust plate in the clutch housing, the thrust plate being drivably connected to the housing whereby rotary motion of the thrust plate relative to the counter-thrust plate is prevented while accommodating relative axial movement of the thrust plate;

a clutch disc assembly having a hub portion adapted to be drivably connected to the driven member and a peripheral portion between the thrust plate and the counter-thrust plate;

a diaphragm spring lever in the housing a radial inward portion of the spring lever being positioned for displacement under an axially extending force, a radial outward portion of the spring lever being engageable with the thrust plate, an intermediate portion of the spring lever being fulcrumed on the housing;

pressure balance springs disposed between the thrust plate and the clutch housing, the pressure balance springs opposing the force applied to the thrust plate by the diaphragm spring lever; and means for adjusting the effective spring force of the pressure balance springs whereby the net force applied to the thrust plate is controlled to effect a desired clutch torque capacity for a given set of operating torque requirements;

the pressure balance springs being compression coil springs seated on the housing;

pull rods connected to the thrust plate, each pull rod extending through a balance spring and including a spring cap, one end of the balance spring engaging the spring cap and an opposite end seated on the housing whereby the effective spring force on the thrust plate is modified;

the means for adjusting the effective spring force of the pressure balance springs comprising spring caps of pre-calibrated thickness against which the pressure balance springs are seated, the spring caps being connected to the pull rods, whereby the compression distance of the pressure balance springs is varied.

4. The friction disc assembly set forth in claim 3 wherein the means for adjusting the effective spring force of the pressure balance springs comprises shims of preselected thicknesses against which the pressure balance springs are seated, the shims being assembled on the pull rods.

5. A friction disc clutch assembly for an automotive vehicle driveline having an engine, a geared transmission and vehicle traction wheels, the clutch being engageable and disengageable to control torque delivery from the engine to the traction wheels through the transmission, the clutch assembly comprising:

a rotary counter-thrust plate connected drivably to the engine and defining an engine flywheel;

a clutch assembly cover connected to and rotatable with the flywheel and defining therewith a clutch housing;

a thrust plate in the clutch housing, the thrust plate being connected drivably to the clutch housing for rotary motion while accommodating axial displacement relative to the flywheel;

a clutch disc assembly having a hub portion, a torque input shaft for the transmission being adapted to be drivably connected to the hub portion;

friction material carried by a peripheral portion of the clutch disc assembly, the friction material being disposed between juxtaposed annular friction surfaces on the thrust plate and the flywheel;

a diaphragm spring lever in the housing, a radial inward portion of the spring lever being positioned for displacement under an axially extending force, a radial outward portion of the spring lever being engageable with the thrust plate, an intermediate portion of the spring lever being fulcrumed on the housing;

pressure balance springs disposed between the thrust plate and the clutch housing, the pressure balance springs opposing the force applied to the thrust plate by the diaphragm spring lever; and means for adjusting the effective spring force of the pressure balance springs whereby the net force applied to the thrust plate is controlled to effect a desired clutch capacity for a given set of operating torque requirements;

the pressure balance springs comprising flat springs secured at one end to the counter-thrust plate and engaging the thrust plate at the other end, the flat springs extending inwardly from a peripheral portion of the clutch assembly cover.

6. A friction disc clutch assembly for an automotive vehicle driveline having an engine, a geared transmission and vehicle traction wheels, the clutch being engageable and disengageable to control torque delivery from the engine to the traction wheels through the transmission, the clutch assembly comprising:

a rotary counter-thrust plate connected drivably to the engine and defining an engine flywheel;

a clutch assembly cover connected to and rotatable with the flywheel and defining therewith a clutch housing;

a thrust plate in the clutch housing, the thrust plate being connected drivably to the clutch housing for rotary motion while accommodating axial displacement relative to the flywheel;

a clutch disc assembly having a hub portion, a torque input shaft for the transmission being adapted to be drivably connected to the hub portion;

friction material carried by a peripheral portion of the clutch disc assembly, the friction material being disposed between juxtaposed annular friction surfaces on the thrust plate and the flywheel;

a diaphragm spring lever in the housing, a radial inward portion of the spring lever being positioned for displacement under an axially extending force, a radial outward portion of the spring lever being engageable with the thrust plate, an intermediate portion of the spring lever being fulcrumed on the housing;

pressure balance springs disposed between the thrust plate and the clutch housing, the pressure balance springs opposing the force applied to the thrust plate by the Belleville spring lever;

means for adjusting the effective spring force of the pressure balance springs whereby the net force applied to the thrust plate is controlled to effect a desired clutch capacity for a given set of operating torque requirements;

the pressure balance springs comprising multiple coil springs, a spring retaining element secured to the counter-thrust plate and extending through the coil springs; and a lift bar carried by the thrust plate and extending into the clutch assembly cover, the coil springs engaging the lift bar whereby the diaphragm spring force is opposed by the force of the coil springs.

7. A friction disc clutch assembly for an automotive vehicle driveline having an engine, a geared transmission and vehicle traction wheels, the clutch being engageable and disengageable to control torque delivery from the engine to the traction wheels through the transmission, the clutch assembly comprising:

a rotary counter-thrust plate connected drivably to the engine and defining an engine flywheel;

a clutch assembly cover connected to and rotatable with the flywheel and defining therewith a clutch housing;

a thrust plate in the clutch housing, the thrust plate being connected drivably to the clutch housing for rotary motion while accommodating axial displacement relative to the flywheel;

a clutch disc assembly having a hub portion, a torque input shaft for the transmission being adapted to be drivably connected to the hub portion;

friction material carried by a peripheral portion of the clutch disc assembly, the friction material being disposed between juxtaposed annular friction surfaces on the thrust plate and the flywheel;

a diaphragm spring lever in the housing, a radial inward portion of the spring lever being positioned for displacement under an axially extending force, a radial outward portion of the spring lever being engageable with the thrust plate, an intermediate portion of the spring lever being fulcrumed on the housing;

pressure balance springs disposed between the thrust plate and the clutch housing, the pressure balance springs opposing the force applied to the thrust plate by the Belleville spring lever;

means for adjusting the effective spring force of the pressure balance springs whereby the net force applied to the thrust plate is controlled to effect a desired clutch capacity for a given set of operating torque requirements;

the pressure balance springs comprising at least one annular pressure balance diaphragm spring; and pull rods secured to the thrust plate and extending through the clutch assembly cover, the pull rods being connected to the at least one annular pressure balance diaphragm spring whereby the force developed by the diaphragm spring lever is opposed by a force of the at least one annular pressure balance spring.

* * * * *